United States

[11] 3,632,193

[72] Inventor John A. Kusters
San Jose, Calif.
[21] Appl. No. 46,911
[22] Filed June 17, 1970
[45] Patented Jan. 4, 1972
[73] Assignee Hewlett-Packard Company
Palo Alto, Calif.

[54] METHOD AND APPARATUS FOR CONTROL OF LIGHT TRANSMISSION THROUGH AN ANISOTROPIC MEDIUM
8 Claims, 6 Drawing Figs.
[52] U.S. Cl.................................................. 350/149,
350/150, 350/157, 350/160, 350/161
[51] Int. Cl........................................................ G02f 1/24
[50] Field of Search............................................ 350/147,
149, 150, 157, 160, 161

[56] References Cited
OTHER REFERENCES
Harris et al., " Acousto–Optic Tunable Filter" J.O.S.A. Vol. 59, No. 6 (June, 1969) pp. 744– 747.

Harris et al., " Electronically Tunable Acousto–Optic Filter" Appl. Phys. Lett. Vol. 15, No. 10 (Nov. 15, 1969) pp. 325– 326

Adrianova, " Study of a Photoelastic Light Modulator" Optics & Spectroscopy Vol. 14, No. 1 (Jan. 1963) pp. 70– 74

Dixon, " Acoustic Diffraction of Light in Anisotropic Media" IEEE J. Quant. Elec. Vol. QE-3, No. 2 (Feb. 1967) pp. 85– 93

Primary Examiner—David Schonberg
Assistant Examiner—Paul R. Miller
Attorney—A. C. Smith ABSTRACT: An electronically tunable acousto-optic filter is disclosed of the type wherein light of a first polarization is diffracted on an acoustical wave traveling collinearly of the light in an anisotropic birefringent medium to shift the polarization of the light from a first polarization to a second polarization. The intensity of the acoustic wave in the birefringent medium is varied to vary the ratio of the intensity of the light diffracted from the first polarization into the second polarization. The band pass of the acousto-optic filter is electronically tuned by varying the frequency of the acoustic wave in the birefringent medium. The acousto-optic device may be employed as an attenuator, chopper, or modulator for light.

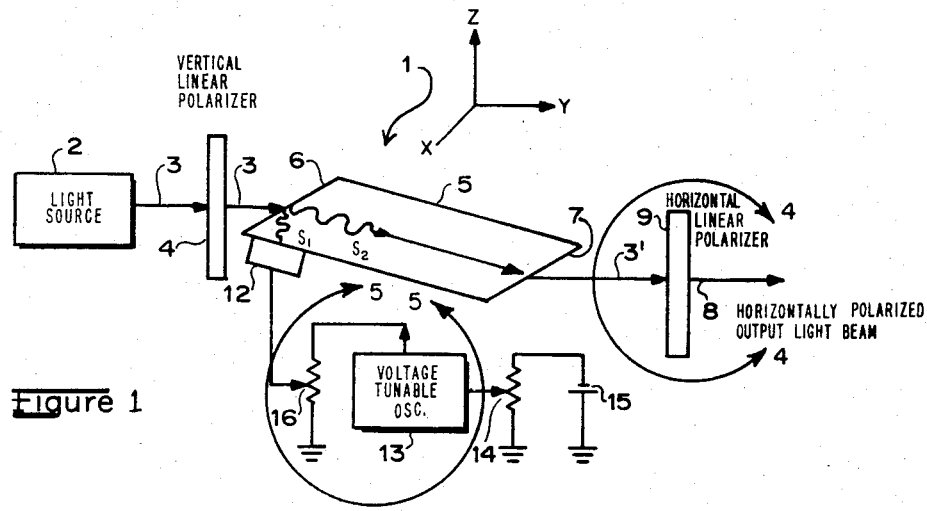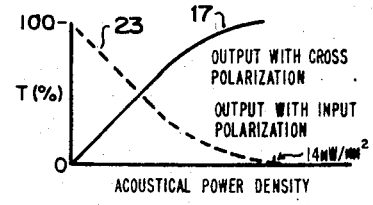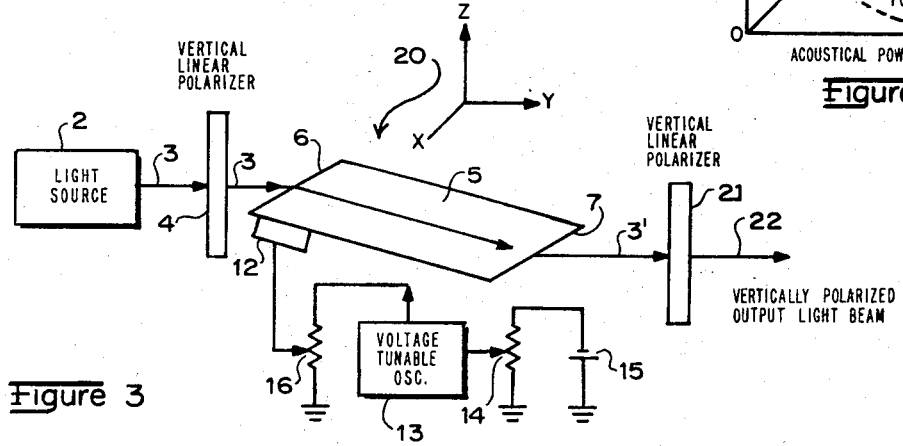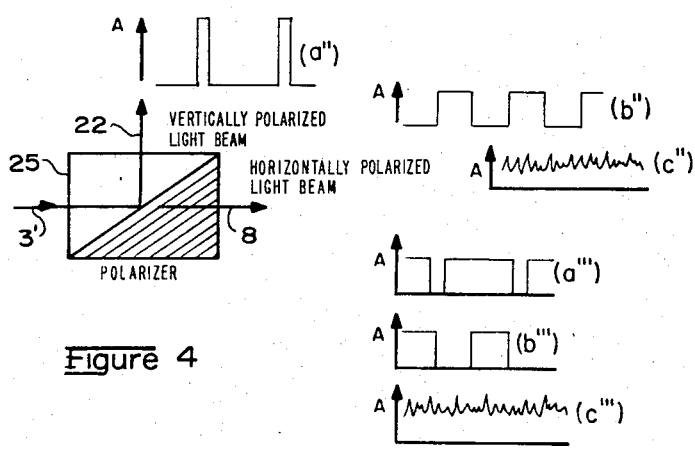

INVENTOR
JOHN A. KUSTERS

3,632,193

METHOD AND APPARATUS FOR CONTROL OF LIGHT TRANSMISSION THROUGH AN ANISOTROPIC MEDIUM

RELATED CASES

Use of the output light beam of the same polarization as the incident light beam is disclosed and claimed in copending U.S. application Ser. No. 47,267, filed June 18, 1970, and assigned to the same assignee as the present invention.

DESCRIPTION OF THE PRIOR ART

Heretofore, electronically tunable acousto-optic filters have been constructed wherein light of a first polarization was collinearly diffracted off of an acoustical wave in an optically anisotropic medium, such as a birefringent crystal, to shift the polarization of the light within the birefringent crystal from a first polarization to a second polarization. The band-pass characteristics of the acousto-optic filter have been electrically tunable by varying the frequency of the acoustic wave within the birefringent crystal. Such an acousto-optic filter is disclosed in an article titled "Acousto-Optic Tunable Filter" appearing in the Journal of the Optical Society of America, Vol. 59, No. 6 of June 1969, pages 744–747, and in an article titled "Electronically Tunable Acousto-Optic Filter" appearing in the Applied Physics Letters, Vol. 15, No. 10, of 15 Nov. 1969, pages 325 and 326.

SUMMARY OF THE PRESENT INVENTION

The principal object of the present invention is the provision of improved method and apparatus for control of light transmission through an optically anisotropic medium.

One feature of the present invention is the provision, in a light transmission method and apparatus of the type wherein light of a first polarization is diffracted from a collinear acoustic wave in an optically anisotropic medium to shift the polarization of the light to a second polarization, of varying the intensity of the acoustic wave in the optically anisotropic medium to very the ratio of the intensity of light diffracted from the first polarization into the second polarization.

Another feature of the present invention is the same as the first feature wherein the acoustic wave in the medium is modulated in intensity to produce a corresponding modulation in the ratio of the intensity of the light diffracted from the first polarization into the second polarization.

Another feature of the present invention is the same as any one or more of the preceding features wherein the acoustic wave in the optically anisotropic medium is 100 percent modulated in intensity to produce a corresponding 100 percent modulation of the intensity of the light diffracted into the second polarization.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form, depicting an acousto-optic apparatus incorporating features of the present invention, FIG. 2 is a plot of light transmission T, in percent, versus acoustic power density in the optically anisotropic medium for output light of two orthogonal polarizations for acousto-optic devices of the present invention, FIG. 3 is a schematic line diagram, partly in block diagram form, of an acousto-optic system incorporating features of the present invention, FIG. 4 is a schematic line diagram of an alternative light polarizer to that portion of the structure of FIG. 1 delineated by line 4—4.

DESCRIPTION OF THE PREFERRED EMBODIMENTS

Figure 5:
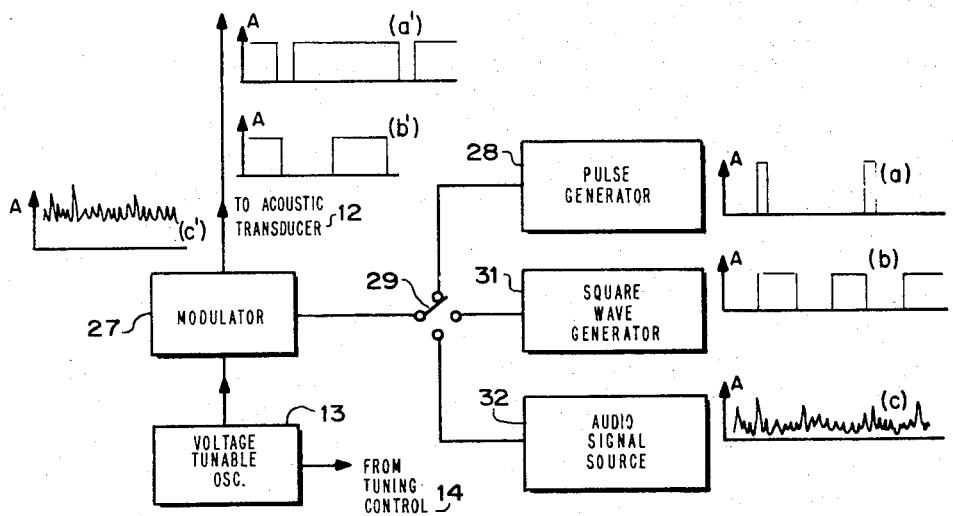
FIG. 5 is a schematic block diagram of an alternative embodiment of that portion of the structure of FIG. 1 delineated by line 5—5.

Referring now to FIG. 1, there is shown an acousto-optic system 1 incorporating features of the present invention. The acousto-optic system 1 is essentially the same as that disclosed in the aforecited Journal of the Optical Society of America with the exception that means have been provided in FIG. 1 for varying the acoustic power density within the optically anisotropic medium to vary the intensity of the output light beam in accordance with variations of the acoustic power density. More specifically, the acousto-optic system 1 includes a light source 2 which projects a beam of light 3 through a vertical linear polarizer 4 into an optically anisotropic medium 5, such as a birefringent crystal of $LiNbO_3$, $PbMoO_4$ or $CaMoO_4$. End faces 6 and 7 of the crystal 5 are cut at the Brewster angle to the Y-axis of the crystal to minimize reflection of the light beam 3 which is directed through the crystal in alignment with the Y-axis between the end faces 6 and 7.

The light source 2 may be of any type. The input vertical polarizer 4 serves to pass only that light from the source 2 which is polarized in the vertical direction, i.e., the Z-direction, to provide a polarized input light beam 3. The input light beam enters the input face 6 of the crystal 5 in which it propagates generally along a predetermined axis labeled the Y-axis and passes out the opposite face 7 as an output beam 3. Output beam 3 is then passed through a second linear polarizer or analyzer 9 which has its axis of transmission orthogonally disposed with respect to the axis of transmission of the input polarizer 4.

An acoustical transducer 12 is mounted in intimate contact with the crystal 5 and is connected to a suitable signal generator or source 13, such as a voltage tunable oscillator, the frequency of which can be varied by means of an input voltage derived from a potentiometer 14 serving as a voltage divider for dividing a voltage supplied by battery 15. The RF output of the voltage tunable oscillator 13 is fed via an adjustable attenuator 16 to the acoustic transducer 12 for generating a shear acoustic wave $S_1$, which is internally reflected and converted to a shear wave $S_2$ upon reflection from input face 6 of the crystal 5. After reflection, the acoustic shear wave and the input light beam 3 propagate collinearly down the Y-axis of the crystal 5. For a particular combination of light wave and acoustic wave frequencies, there is found to be a strong interaction between the light and the acoustic wave in which the acoustic wave diffracts the light waves from the polarization orientation of the input beam into the orthogonal polarization. This yields a narrow pass band of light waves of orthogonal polarization which are then separated from the input light waves by horizontal linear polarizer 9. This narrow pass band of light waves is a function of the applied acoustical frequency and can therefore be varied in frequency by varying the frequency of excitation supplied by the voltage tunable oscillator 13.

This collinear diffraction occurs as a cumulative effect for a very narrow band of light frequencies, and it is noncumulative by incremental self-cancellation for other frequencies. The cumulative diffraction effect occurs when the momentum vectors of the incident light and acoustic waves satisfy the relation that their sum equals that of the output light beam. This condition is called "phase matching" and occurs when the diffraction generated polarization travels at the same velocity as the free electromagnetic wave. A narrow band of frequencies satisfying this relation and diffracted into the orthogonal polarization is then passed by the output analyzer 9 while the light of the initial polarization is blocked by the output analyzer 9.

Diffraction into the orthogonal polarization occurs via the $p_{41}$ photoelastic constant, and is only cumulatively if: $|k_o|-|k_e|=|k_a|$ where the $_o$, $_e$ and $_a$ denote the ordinary and extraordinary light waves, and the acoustic wave, respectively. This will be the case if the light and acoustic frequencies $f_o$ and $f_a$ are related by:

$$f_0 = \frac{cf_a}{V|\Delta n|} \qquad \text{Eq. (1)}$$

where $c/V$ is the ratio of the light velocity in vacuum to the acoustic velocity in the medium, and $\Delta n$ is the birefringence of the crystal.

In a typical case of lithium niobate, the acousto-optic device 1 is tunable from 7,000 to 5,500 A. by changing the acoustic drive frequency from 750 to 1,050 MHz. A band pass of less than 2 A. is obtained for output beam 8 with a crystal 5 cm. long.

The light transmission characteristic for the acousto-optic device 1 of FIG. 1 is shown by curve 17 of FIG. 2. More specifically, as attenuator 16 is adjusted for varying the acoustic power density in the crystal 5, the percent transmission of light from the input vertically polarized light beam 3 varies from zero percent with zero acoustic power density to nearly 100 percent transmission at a relatively high acoustic power density of 14 mw./mm.$^2$.

With a monochromatic input light beam 3, and neglecting losses in the optical system 1, an examination of the theory involved shows that, in the acoustically tuned optical filter system 1, the ratio of output light intensity for output beam 8 to the input light intensity of input beam 3 can be expressed as:

$$\frac{\bar{P}_x \text{ out}}{\bar{P}_z \text{ input}} = QP_d \left[ 1 - \frac{QP_d}{3} + \frac{2Q^2 P_d^2}{45} - \frac{Q^3 P_d^3}{315} + \cdots \right] \quad \text{Eq. (2)}$$

Where $\bar{P}_z$ is the input light intensity polarized along some axis arbitrarily designated, $z$, and $\bar{P}$ is the output light intensity polarized along some arbitrary axis, $x$, which is orthogonal to $z$, $Q$ is a function of the physical properties of the medium used and of the input light wavelength and is constant for monochromatic light input, and $P_d$ is the acoustic power density in the medium. Therefore, for low acoustic power density, the output intensity can be expressed as: $\bar{P}_{x\ out} = Q\ P_d\ \bar{P}_{z\ input}$ Eq. (3)

Thus, by controlling the amplitude of the acoustic signal, a direct control of output light intensity of obtained. Thus, the acousto-optic system 1 of FIG. 1 serves as a means to provide a constant, precisely determined, and controlled optical loss in a light path. The intensity of the output light beam 8 is readily controlled by merely adjusting potentiometer 16. In the acousto-optic system of FIG. 1, approximately 100 percent of the vertically polarized light input at 5,000 A. is diffracted from the vertical polarization to the horizontal polarization when the acoustic power density is 14 milliwatts per square millimeter within the LiNbO$_3$ crystal 5 and the crystal 5 is 5 centimeters long. However, the acoustic power density required for 100 percent conversion from the first to the second polarization varies inversely as the square of the acoustic frequency $f_a$.

Referring now to FIG. 3, there is shown an alternative acousto-optic device 20 incorporating features of the present invention. The acousto-optic device 20 of FIG. 3, is substantially identical to that of FIG. 1 with the exception that the output linear polarizer 21, instead of being horizontally polarized, is vertically polarized such that it has the same polarization as the input linear polarizer 4. In such a case, the output light beam 22 is vertically polarized and consists of that portion of the vertically polarized input beam 3 which has not been diffracted by the acoustic wave within the crystal 5 to the horizontal polarization. The percent light beam transmission versus acoustic power density for that portion of the output beam 22 falling within the passband of the acousto-optic filter is shown by curve 23 of FIG. 2. In such a case, the output beam 22 has its highest intensity at zero acoustic power density within the crystal 5 and output beam 22 is attenuated with increased acoustic power density within the crystal 5. At a power density of approximately 14 mw. per square millimeter within the light beam path within the crystal 5, substantially 100 percent of the vertically polarized input light within the passband is diffracted into the orthogonal horizontal polarization such that the output beam 22 has zero intensity. That portion of the light within the polarized input beam 3 which is outside the passband of the acousto-optic filter passes through the device and is present in output beam 22.

Referring now to FIG. 4, there is shown an alternative linear polarizer 25, such as a polarizing prism of the Rochon type. This type of polarizing prism or analyzer 25 is characterized by passing light of one linear polarization through the prism 25 while reflecting light of an orthogonal polarization into a beam path at right angles to the incident beam. Thus, with polarizer or analyzer 25 employed as the output polarizer in the acousto-optic system of FIG. 1, the output beam 8 is horizontally polarized, whereas the reflected beam 22 is vertically polarized. Output beam 8 has a transmission characteristic depicted by curve 17 of FIG. 2 and output beam 22 has a transmission characteristic depicted by curve 23 of FIG. 2 for that portion of the light beam 3 having frequencies within the passband of the acousto-optic device.

Referring now to FIG. 5, there is shown alternative method and apparatus for time varying the intensity of the output light beam or beams in the acousto-optic systems of FIGS. 1, 3 and 4. More specifically, the RF output of the voltage tunable oscillator 13 is fed to the acoustic transducer 12 via a modulator 27 wherein the intensity of the acoustic drive energy is modulated in accordance with input signals applied to the modulator 27. For a case of pulse modulation of the output beams 8 and 22 of FIG. 4, a pulse generator 28, producing a waveform of the type shown by waveform ($a$), is switched into the input of the modulator 27 via switch 29 to produce a pulse-modulated RF output of the modulator 27, as shown by envelope waveform ($a'$). This pulse modulation of the acoustic power density within the birefringent crystal 5 produces a corresponding pulse modulation of the output beams 8 and 22 with the vertically polarized light output beam 22 having a pulse modulation waveform as shown by waveform ($a''$) of FIG. 4 and the horizontally polarized light output beam 8 having a pulse waveform as shown by waveform ($a'''$) of FIG. 4.

In an alternative modulation scheme, the output beams 8 and 22 are square wave modulated or chopped by switching switch 29 to the output of a square wave generator 31 which provides an input waveform of the type shown by waveform ($b$) to the modulator 27. Modulator 27 modulates the RF acoustic drive power derived from the voltage-tunable oscillator 13 in accordance with envelope waveform ($b'$) to produce a resultant modulation of horizontally polarized output beam 8 of the type shown by waveform ($b'''$) and a corresponding modulation of output beam 22 having a modulated waveform as depicted by waveform ($b''$).

In both the pulse modulation and square wave modulation of the output beams, the output beams can be chopped, i.e., interrupted by causing the depth of the modulation of the acoustic power density to be at the 100 percent transmission amplitude, as shown in FIG. 2. The rise and fall times of the light pulses are primarily a function of the acoustic velocity in the crystal 5 and the length of the crystal 5. More particularly, the lower the acoustic velocity and the longer the length of the crystal 5, the longer will be the rise and fall times of the light pulses.

As an alternative to pulse modulation and chopping of the output light beams, the light beams 8 and 22 may be modulated with information. In this embodiment, switch 29 is switched to the output of an audio signal source 32 which modulated the RF acoustic drive power with a signal modulation, for example, of the type depicted by waveform ($c$). The audio signal appears as modulation on the RF acoustic drive power and may have a typical waveform as that shown by waveform ($c'$). This modulation of the acoustic drive power produces modulation of the output beams 8 and 22 as indicated by waveforms ($c'''$) and ($c''$), respectively.

The output characteristics for the cross-polarized output beam, namely, output beam 8 is always as shown by curve 17 of FIG. 2. However, the transmission characteristics for the output beam having the same polarization as the input beam, namely, beam 22, has transmission characteristics as shown by curve 23 only for that portion of the band of light frequencies within the passband of the acousto-optic device for output beam 8. Thus, transmission characteristic curve 23 will hold when the light source 2 is such a character as to provide light confined only to the band pass of the acousto-optic device for beam 8. For that portion of the light spectrum of the input light beam 3 which falls within a range of frequencies outside the band pass of the acousto-optic device for beam 8, there will be substantially 100 percent transmission through the birefringent medium 5 and into the output beam 22. Thus, the various output light modulation waveforms ($a'''-c'''$) hold only for that spectral portion of the output beam 22 falling within the band pass of output beam 8.

Figure 6:
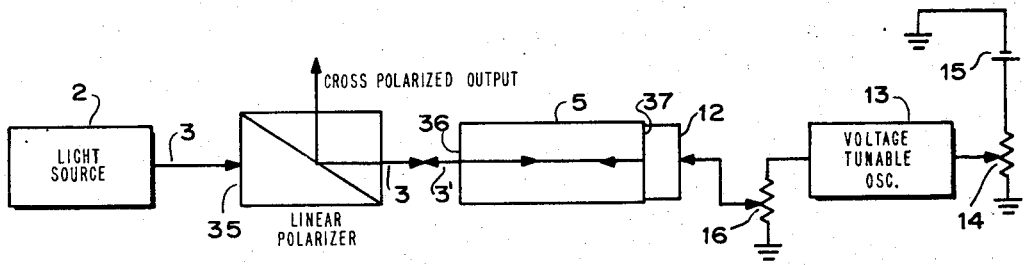
FIG. 6 is a schematic line diagram, partly in block diagram form, depicting an alternative embodiment of the present invention.

Referring now to FIG. 6, there is shown an alternative acousto-optic system incorporating features of the present invention. More specifically, the system is substantially the same as that shown by FIG. 1 with the exception that the input linear polarizer is formed by a polarizing prism 35 as, for example, of the Rochon type which also serves as an output analyzer for light of an orthogonal polarization which is traveling in the opposite direction. In addition, the birefringent crystal 5' is cut with 90° faces 36 and 37 with face 37 joined to the acoustic transducer 12. Face 37 of the crystal 5' is provided with an optically reflective coating. The length of the crystal 5' is adjusted to be resonant for the acoustic wave energy at a certain desired operating frequency as determined by the aforecited relationships relating the acoustic frequency to the output light frequency. The linear polarized light beam enters crystal 5 at input face 36 and is collinearly diffracted off the acoustic wave within the birefringent medium 5' to diffract light from the input polarization into an orthogonal cross polarization within the birefringent medium 5'. The diffracted light along with the incident beam is reflected from reflective face 37 and cumulatively diffracted in the reflected direction into the cross polarized mode. The light reflected out of the crystal 5' through face 36 is directed onto the linear polarizer 35 which reflects the cross polarized light beam into an output beam 8. Output beam 8 has all the characteristics previously described with regard to output beam 8 of FIGS. 1 and 4.

An advantage to the use of the resonant crystal 5' is that increased diffraction is obtained due to the standing resonant waves in the acoustic resonator 5' and, therefore, less acoustic power is required to achieve a certain amount of diffraction of light from the input polarization into the crossed-polarized output beam 8. As in the embodiments of FIGS. 1 and 5, the intensity of the cross-polarized output beam 8 is varied by varying the acoustic power density within the light beam path within the birefringent medium 5'.

Furthermore, the acoustic drive power may be modulated, as previously described with regard to FIG. 5, to produce corresponding output modulation of beam 8, as previously described with regard to FIG. 4. The band pass characteristic of the device of FIG. 6 is tunable by varying the frequency of the voltage tunable oscillator 13 within the resonant bands of the acoustic resonator 5. Also, the birefringent crystal 5 need not be acoustically resonant.

It is to be understood that the input polarizer 4 need not be employed in the aforedescribed systems except that it eliminates undesired background light in the output beams 8 and 22. Also, the output analyzer or polarizer 9, 21 and 25 may be located in a receiver at a remote location for analyzing the modulated output beam 3 as transmitted over a long distance from the acousto-optic modulator and transmitter.

As used herein "light" is defined as electromagnetic radiation. Such light need not be confined to the visible spectrum.

In some birefringent crystals the phase velocity and group velocity vectors for the acoustic wave are divergent and may diverge by as must as 20°. In such a case, the light beam path may be collinear with either the phase or group velocity of the acoustic wave to obtain the "phase matched" collinear diffraction described herein. Therefore, as used herein "collinear" means that the light beam path is collinear with either the phase or group velocity of the acoustic wave.

Since many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. In a method for control of diffraction of light from a first polarization to a second polarization passing through an optically anisotropic medium the steps of, introducing light of the first polarization into the anisotropic medium, producing an acoustical wave in the anisotropic medium which is substantially collinear with the path of the light passing through the anisotropic medium, diffracting the light of the first polarization on the acoustic wave in the anisotropic medium to shift the polarization of the light within the anisotropic medium from the first polarization to a second polarization, and varying the intensity of the acoustic wave in the anisotropic medium as a recurring function of time to vary the ratio of the intensity of light diffracted from the first polarization into the second polarization as a recurring function of time.

2. The method of claim 1 wherein the step of varying the intensity of the acoustic wave in the anisotropic medium comprises the step of, modulating the intensity of the acoustic wave in the anisotropic medium to produce a substantially proportional modulation of the ratio of the intensity of the light diffracted from the first polarization into the second polarization at a frequency of optical intensity variation equal to the frequency of acoustical intensity variation.

3. The method of claim 1 wherein the step of varying the intensity of the acoustic wave in the anisotropic medium comprises the step of, producing substantially 100 percent modulation of the intensity of the acoustic wave within the anisotropic medium to produce a corresponding substantially 100 percent modulation of the intensity of the light diffracted from the first polarization into the second polarization.

4. In an apparatus for control of the diffraction of light from a first polarization to a second polarization passing through an optically anisotropic medium, means for introducing light of a first polarization into the anisotropic medium, first means coupled to said medium for producing an acoustical wave in the anisotropic medium which is collinear with the light path therein for diffracting light of the first polarization on the acoustic wave in the anisotropic medium to shift the polarization of the light within the anisotropic medium to shift the polarization of the light within the anisotropic medium from the first polarization to a second polarization, and second means coupled to said first means for varying the intensity of the acoustic wave in the anisotropic medium as a recurring function of time to vary the ratio of the intensity of the light diffracted from the first polarization into the second polarization as a recurring function of time.

5. The apparatus of claim 4 wherein said second means for varying the intensity of the acoustic wave in the anisotropic medium comprises circuit means for modulating the intensity of the acoustic wave in the anisotropic medium to produce a substantially proportional modulation of the ratio of the intensity of the light diffracted from the first polarization into the second polarization at a frequency of optical intensity variation equal to the frequency of acoustical intensity variation.

6. The apparatus of claim 4 wherein said second means for varying the intensity of the acoustic wave in the anisotropic medium comprises source means of modulating signal for producing substantially a 100 percent modulation of the intensity of the acoustic wave within the anisotropic medium to produce a corresponding substantially 100 percent modulation of the intensity of the light diffracted from the first polarization into the second polarization.

7. In an acousto-optic device, an optically anisotropic medium means disposed to receive a beam of light for propagating the light beam as a particular wave having a first polarization orientation in a birefringent system, said medium means being further capable of propagating a light beam polarized in a second polarization orientation different from the first beam as another wave of said birefringent system, first means coupled to said medium means for developing in said anisotropic medium means an acoustic wave at a predetermined frequency for which the vector sum of the momentum vectors of the incident light beam and the acoustic wave are equal to that of an output light beam oriented at said second polarization with respect to the polarization of the input light beam for diffracting an incident light beam satisfying that condition for a given acoustic wave frequency into that second polarization orientation, and second means coupled to said medium means for varying the intensity of the acoustic wave in said medium means as a recurring function of time to vary the ratio of the intensity of the light beam diffracted from the first polarization into the second polarization as a recurring function of time.

8. The apparatus as claimed in claim 7 wherein said anisotropic medium means comprises a birefringent crystal operable as an acoustic resonator resonant at the frequency of the acoustic wave propagating within said crystal to establish standing waves of acoustic energy within said crystal which vary in amplitude as a recurring function of time.

* * * * *